United States Patent
Kajiura et al.

(10) Patent No.: US 8,829,751 B2
(45) Date of Patent: Sep. 9, 2014

(54) ACTUATOR FOR VARIABLE VALVE OPERATING APPARATUS

(75) Inventors: Mikihiro Kajiura, Inagi (JP); Shinichi Kawada, Isehara (JP); Kotofumi Yanai, Isehara (JP); Hiroyuki Nemoto, Hitachi (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 406 days.

(21) Appl. No.: 13/276,822

(22) Filed: Oct. 19, 2011

(65) Prior Publication Data

US 2012/0112585 A1 May 10, 2012

(30) Foreign Application Priority Data

Nov. 5, 2010 (JP) ................. 2010-248231

(51) Int. Cl.
H02K 5/16 (2006.01)
(52) U.S. Cl.
USPC .............................. 310/90; 310/89
(58) Field of Classification Search
CPC ... H02K 5/124; F16J 15/3204; F16J 15/3232; F01L 1/10
USPC .............. 310/90, 89; 277/560, 562
See application file for complete search history.

(56) References Cited

U.S. PATENT DOCUMENTS

| | | | |
|---|---|---|---|
| 4,721,314 A * | 1/1988 | Kanayama et al. | 277/576 |
| 6,177,744 B1 * | 1/2001 | Subler et al. | 310/90 |
| 7,344,140 B2 * | 3/2008 | Ikeda | 277/572 |
| 8,490,588 B2 * | 7/2013 | Nakamura | 123/90.16 |
| 2003/0151320 A1 * | 8/2003 | Poon et al. | 310/90 |
| 2006/0169233 A1 | 8/2006 | Kimura et al. | |
| 2008/0067759 A1 | 3/2008 | Ashida et al. | |

FOREIGN PATENT DOCUMENTS

| | | |
|---|---|---|
| JP | 58-160695 U | 10/1983 |
| JP | 59-139383 U | 9/1984 |
| JP | 59-160695 U | 10/1984 |
| JP | 7-10534 U | 2/1995 |
| JP | 2000-46196 A | 2/2000 |
| JP | 2001-153232 A | 6/2001 |
| JP | 2004-100860 A | 4/2004 |
| JP | 2006-144551 A | 6/2006 |
| JP | 2006-214290 A | 8/2006 |

(Continued)

OTHER PUBLICATIONS

Japanese Office Action dated Feb. 5, 2013 (three (3) pages).

*Primary Examiner* — Hanh Nguyen
(74) *Attorney, Agent, or Firm* — Crowell & Moring LLP

(57) ABSTRACT

An electric motor includes a motor casing formed with a shaft insertion hole and a motor output shaft extending in the shaft insertion hole and projecting to a speed reducing mechanism. An annular oil seal is disposed between the shaft insertion hole and the motor output shaft and the annular oil seal includes an annular seal retainer buried in the annular oil seal for reinforcement. A C-shaped stopper member extending circumferentially from a first end to a second end spaced from the first end, is held in a holding portion or a fitting groove of the shaft insertion hole, and arranged to prevent movement of the oil seal toward the speed reducing mechanism. The stopper member includes a plurality of beam segments confronting the seal retainer from an axial direction of the motor output shaft.

14 Claims, 7 Drawing Sheets

(56) References Cited

FOREIGN PATENT DOCUMENTS

| JP | 2008-69909 A | 3/2008 |
| JP | 2008-175322 A | 7/2008 |
| JP | 2008-261343 A | 10/2008 |
| JP | 2009-8003 A | 1/2009 |
| JP | 2009-47050 A | 3/2009 |
| JP | 2009-85133 A | 4/2009 |
| JP | 2010-210005 A | 9/2010 |

* cited by examiner

ACTUATOR FOR VARIABLE VALVE OPERATING APPARATUS

BACKGROUND OF THE INVENTION

The present invention relates to an actuator for a variable valve operating apparatus or system for varying a valve operating characteristic such as a valve lift or an operation angle of an intake or exhaust valve of an internal combustion engine in accordance with engine operating condition or conditions.

A Japanese patent document JP 2006-144551A discloses an actuator for a variable valve operating apparatus. This variable valve operating apparatus includes a drive shaft driven through a sprocket by a crankshaft of an engine, a cam shaft including at least one swing cam, a multi-link motion transmitting mechanism connected between the drive shaft and the swing cam, a control element such as a control shaft to vary a valve opening/closing timing or timings and an operation angle of an intake valve by varying the posture of the motion transmitting mechanism in accordance with engine operating condition(s), and an actuator to control the rotational angular position of the control shaft.

The actuator includes an electric motor controlled by a control unit, and a speed reducing mechanism for transmitting a rotational force of the motor to the control shaft with speed reduction. The motor includes a motor casing connected with the speed reducing mechanism, motor components such as coil enclosed in the motor casing, and a motor output shaft driven by the motor components. The motor output shaft is received in a shaft insertion hole formed in the motor casing. In the inside circumferential surface of the shaft insertion hole, there is provided an oil seal to prevent leakage of a lubricating oil from the inside of the speed reducing mechanism into the motor casing.

SUMMARY OF THE INVENTION

However, in the above-mentioned actuator, the oil seal might be shifted slightly by changes in the internal pressure in the motor casing due to changes in the ambient temperature. Accordingly, there is a possibility of decrease of the sealing performance of the oil seal, and ingress of the lubricating oil from the speed reducing mechanism into the motor casing.

Therefore, it is an object of the present invention to provide an actuator suitable for ensuring a stable installed condition of an oil seal in a motor casing in spite of changes in ambient temperature and preventing deterioration of the sealing performance of the oil seal.

According to one aspect of the present invention, an actuator comprises: an electric motor including a motor casing formed with a shaft insertion hole and a motor output shaft extending in the shaft insertion hole; a mechanism to transmit a rotational driving force of the motor output shaft to the control shaft; an annular oil seal which is disposed between the shaft insertion hole and the motor output shaft and which includes an annular seal retainer buried in the annular oil seal for reinforcement; and a ring-shaped stopper member which extends circumferentially from a first end to a second end spaced from the first end, which is held in a holding portion of the shaft insertion hole and which is arranged to prevent movement of the oil seal toward the speed reducing mechanism. The stopper member includes a plurality of beam segments confronting the seal retainer from an axial direction of the motor output shaft.

DETAILED DESCRIPTION OF THE INVENTION

Figures show variable valve operating actuators according to embodiments of the present invention. In these embodiments, the variable valve operating apparatus for an internal combustion engine is applied to the intake side of one bank including three cylinders in a V6 engine.

First Embodiment

Figure 4:
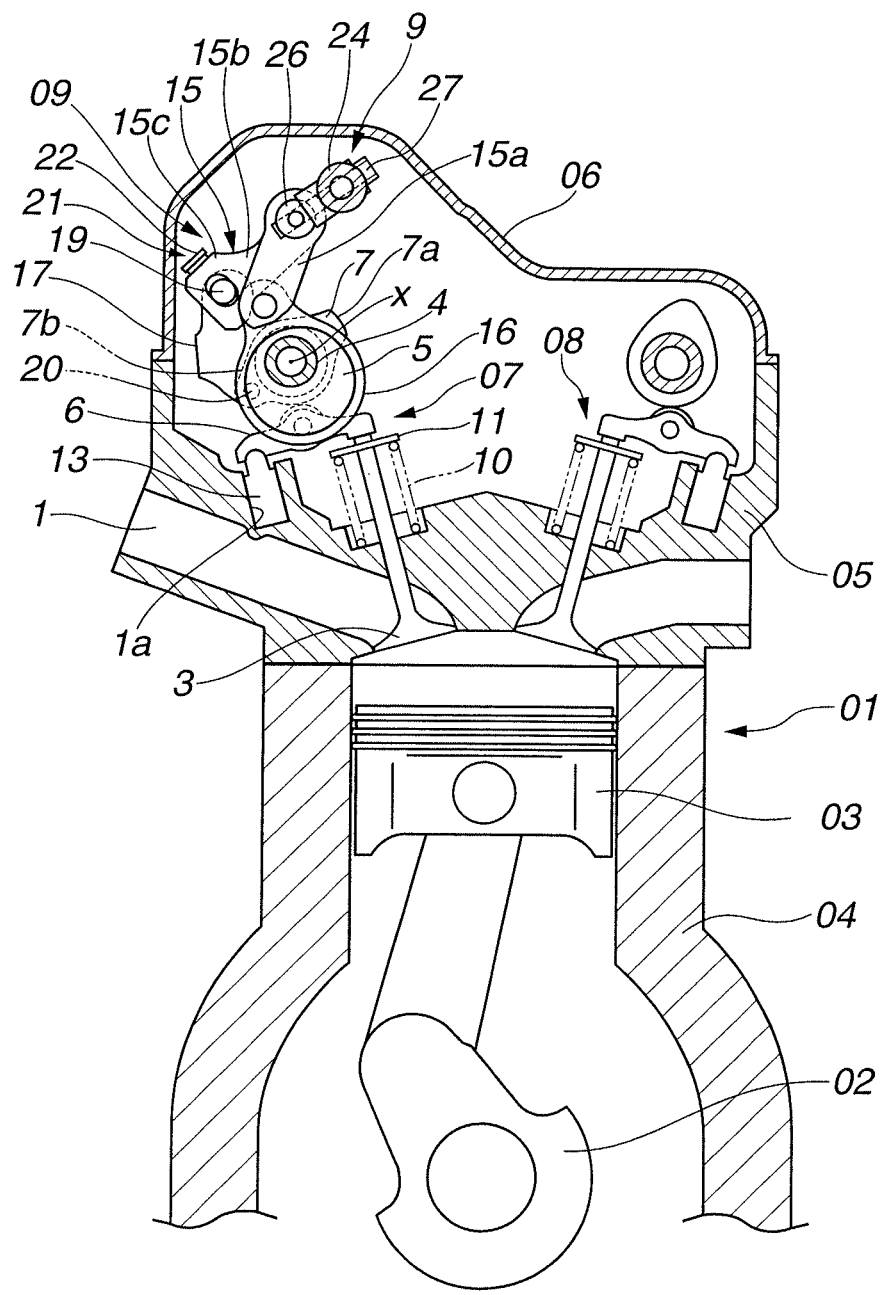
FIG. 4 is a sectional view showing a main portion of an internal combustion engine to which the actuator of FIG. 1 is applied.

An internal combustion engine 01 has a general construction as shown in FIG. 4. Engine 01 includes a crankshaft 02, a cylinder block 04 having at least one cylinder bore in which a piston 03 is slidable, a cylinder head 05 fixedly mounted on cylinder block 04, and a head cover 06 closing the upper side of cylinder head 05. Moreover, engine 01 includes an intake side valve operating apparatus or system 07 and an exhaust side valve operating apparatus or system 08 provided, for each of the cylinders, in an upper part of the cylinder head 05. The intake side valve operating apparatus 07 includes a variable valve operating mechanism 09 for varying a valve lift and an operation angle of intake valves 3 as mentioned later in accordance with engine operating condition or conditions.

In this example, as shown in FIG. 4, the intake side valve operating apparatus 07 provided with the variable valve operating mechanism 09 includes: two intake valves 3, 3 provided, for each cylinder, slidably in cylinder head 05 through valve guides (not shown), and arranged to open and close the respective open ends of an intake port 1; a drive shaft 4 of a hollow cylindrical shape, extending in a longitudinal direction (or front and rear direction) of the engine, a pair of swing cams 7, 7 arranged to open and close the intake valves 3, 3 through swing arms 6, 6 disposed, as followers, for the upper ends of intake valves 3, 3; a linkage or motion transmitting mechanism 8, interconnected between drive cam 5 and swing cams 7, 7, and arranged to convert a rotational force of the drive cam 5 into a swing motion, and to transmit motion to the swing cams 7, 7 as a swing force; and a control mechanism 9 to control the valve lift (or valve lift quantity) and the operation angle of each intake valve 3 in accordance with one or more engine operating conditions. The operation angle indicates a period during which intake valve 3 is open.

Each of intake valves 3, 3 is urged to a closing position to close the open end of intake port 1, by a valve spring 10 disposed between a bottom of a cylindrical bore installed or formed in the upper part of cylinder head 05, and a spring retainer 11 attached to an upper end of a valve stem.

Figure 5:
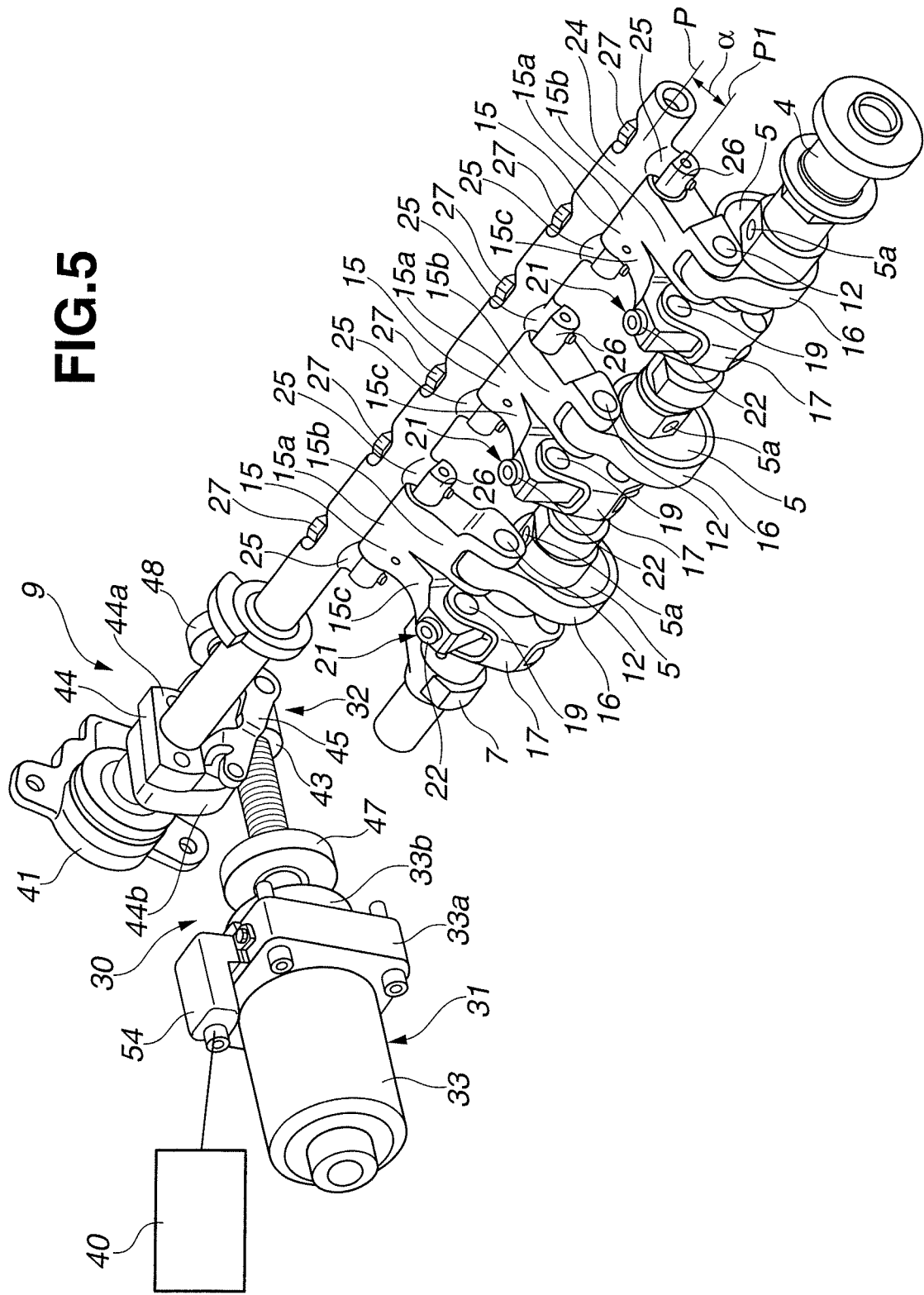
FIG. 5 is a perspective view showing the actuator.

Drive shaft 4 is provided with at least one drive cam 5 formed on the outside circumference of drive shaft 4, as shown in FIG. 5. Drive shaft 4 is supported rotatably by five bearing portions (not shown) provided in the upper part of cylinder head 05. Drive shaft 4 is arranged to receive rotation from the crankshaft of the engine through a sprocket (not shown) provided at one end of drive shaft 4, and to rotate in a clockwise direction as viewed in FIG. 4.

Drive cam 5 includes a cam main body shaped like a circular disc, and a tubular boss portion formed integrally in one side of the cam main body. The boss portion is formed with a radially extending pin hole. The drive cam 5 is mounted on drive shaft 4 and fixed to drive shaft 4 by a fastening pin 5*a* inserted through the radially extending pin hole. The drive cam 5 is located on one side of swing cam 7, and the cam main body of the drive cam 5 is disposed axially between the swing cam 7 and the boss portion of the drive cam 5. The cam main body is disposed, through a spacer, at the side of the adjacent swing cam 7. The cam main body has an outside circumferential surface shaped in the form of a cam profile of an eccentric circle, and the axis is offset in the radial direction by a predetermined distance from the axis X of drive shaft 4.

As shown in FIG. 4, each of swing arms 6 includes a recessed first end having a lower surface abutting on the stem end of the corresponding intake valve 3, and a second end having a spherical lower surface abutting on a spherical upper end of a hydraulic lash adjuster 13 received in a hole 1*a* formed in cylinder head 05 so that the swing arm 6 can swing about the upper end of the lash adjuster 13, as a pivot point. A roller 14 is supported rotatably on the swing arm 6 at a middle portion of a hollow shape, and arranged to abut on the swing cam 7.

Each swing cam 7 is shaped like a raindrop as shown in FIGS. 4 and 5. The swing cam 7 includes a base portion including a hollow cylindrical cam shaft portion 7*a* which is formed integrally and which fits over the drive shaft 4. Through the cam shaft portion 7*a*, the swing cam 7 is swingably supported on drive shaft 4 so that the swing cam 7 can swing about the axis X of drive shaft 4 as a swing axis. The swing cam 7 includes a lower surface extending from the base portion to a forward end portion formed as a cam nose. This lower surface includes a cam surface abutting on the outside circumferential surface of the roller 14 of the swing arm 6 at a shifted position in accordance with a swing position of the swing cam 7.

Each swing cam 7 is so set that the swing direction to open the intake valve 3 by moving the cam surface to the lift surface's side is identical to the rotational direction of drive shaft 4.

Furthermore, the swing cam 7 on the drive cam's side is formed integrally with a connecting portion 7*b* opposing to the cam nose portion across the cam shaft portion 7*a*. The connecting portion 7*b* is formed with a pin hole extending through to both lateral sides to receive a connecting pin for connection with a second end of a later-mentioned link rod 17.

As shown in FIGS. 4 and 5, the linkage or motion transmitting mechanism 8 is a multilink mechanism including a rocker arm 15 spread in the widthwise direction of the engine, above the drive shaft 4, a link arm 16 connecting the rocker arm 15 and the drive cam 5, and a link rod 17 connecting the rocker arm 15 and the connecting portion 7*d* of the swing cam 7 on one side.

The rocker arm 15 includes a tubular base portion 15*a* swingably supported on a control eccentric shaft 26 on a first end side, and first and second arms 15*b* and 15*c* projecting from the outside surface of the tubular base portion 15*a* side by side in the form of a bifurcated shape, to the inner side of the engine.

The tubular base portion 15*a* includes a support hole extending through the tubular base portion 15*a*, and fitting over the control eccentric shaft 26 with a minute clearance. The first arm 15*b* includes a forward end portion bifurcated to support, from both sides, a projecting end of the link arm 16 rotatably through a connection pin 12. The second arm 15*c* includes a forward end portion in the form of a block portion 15*f* which is provided with a lift adjusting mechanism 21. Lift adjusting mechanism 21 includes a pivot pin 19. A first end portion of the link rod 17 is connected rotatably with the pivot pin 19. The block portion 15*f* includes an elongated hole extending through from one side surface to the other side surface of block portion 15*f* and receiving the pivot pin 19 in such a manner that the pivot pin 19 is movable up and down.

The first and second arms 15*b* and 15*c* extend in two different directions from the base portion 15*a* so that the positions of the forward ends of first and second arms 15*b* and 15*c* are spaced slightly in the up and down direction from each other. The forward end portion of first arm 15*b* is inclined downward with a small inclination angle below the forward end portion of second arm 15*c*.

The link arm 16 includes an annular portion having a relatively large diameter, and the before-mentioned projecting end portion projecting from a predetermined position of the outside circumference of the annular portion. The annular portion includes an engagement hole formed at the center of the annular portion. In this engagement hole, the drive cam 6 is fit rotatably.

Each of the link rods 17 is a single integral member formed by press forming, in the shape of C in a cross section. The link rod 17 includes a first end portion 17*a* which is connected, through the pivot pin 19 inserted through the pin hole, with the forward end portion of the second arm 15*c*, and a second end portion which is connected rotatably, through a connection pin 20 inserted through a pin hole, with the connecting portion 7*b* of the swing cam 7 on the one side.

The swing cam 7 lifts the intake valve 3 when the connecting portion 7*b* is pulled up by the link rod 17. The cam nose portion receiving the input from the roller 14 is located on the opposite side to the connecting portion 7*b* with respect to the swing axis. This arrangement can restrain falling inclination of the swing cam 7.

The lift adjusting mechanism 21 enables fine adjustment of the lift of each intake valve 3 by adjusting the position of the pivot pin 19 in the up and down direction in the elongated hole with an adjusting bolt after assemblage of the component parts. After the operation of this fine adjustment, the pivot pin 19 is fixed firmly by tightening a locking bolt 22.

Figure 6:
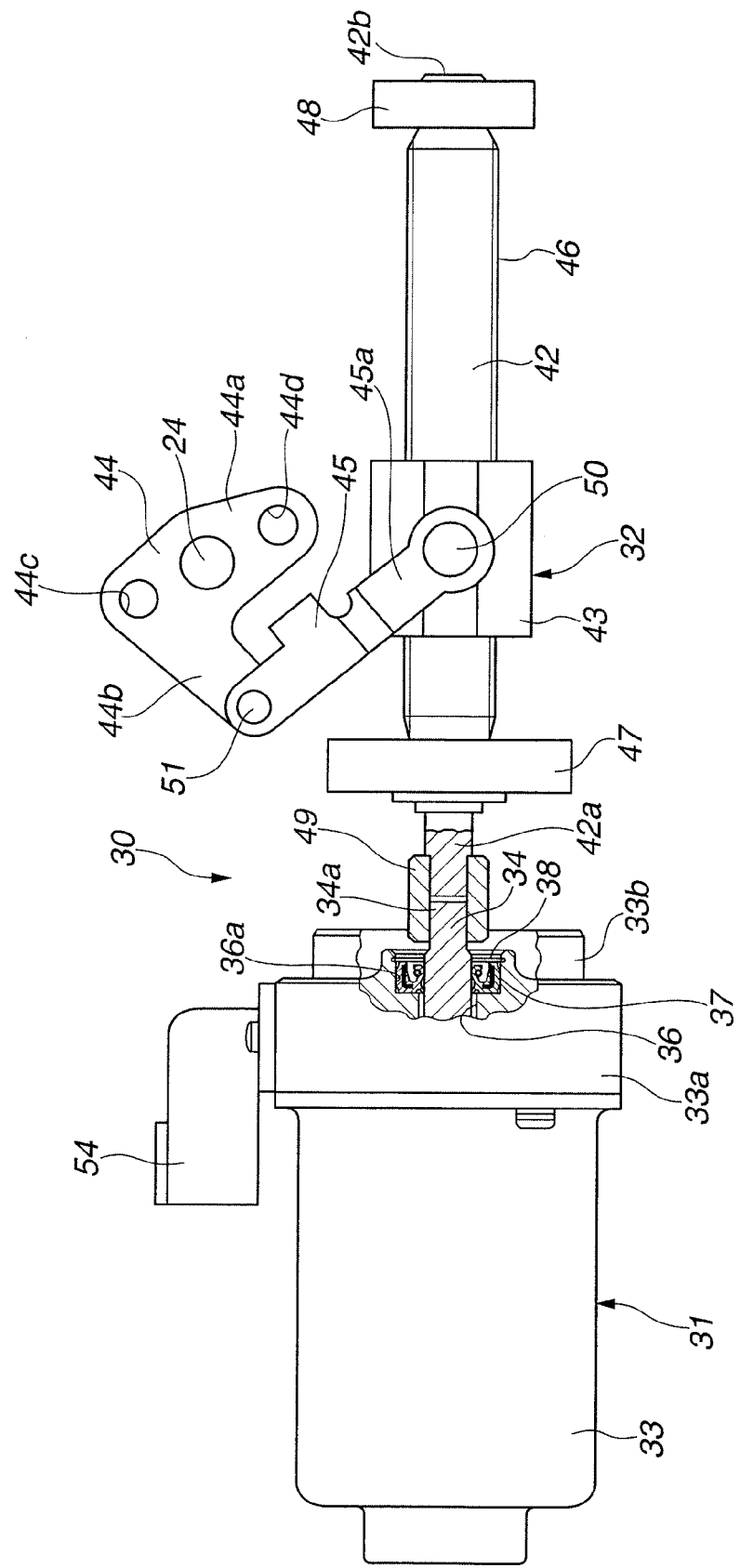
FIG. 6 is a side view schematically showing a main portion of the actuator.

As shown in FIGS. 4~6, the control mechanism 9 includes a hollow control shaft 24 extending in parallel to the driven shaft 4, at the position above drive shaft 4, a pair of cylindrical boss portions 25 projecting radially from the outside circumferential surface of control shaft 24, the hollow control eccentric shaft 26 connected to the forward portion of the bass portion 25 by a bolt 27, and an actuator 30 to rotate the control shaft 24 drivingly.

The control shaft 24 includes a pair of flat surface regions formed in the outside circumferential surface at a position opposite to each boss portion 25. A bolt hole extends radially from each flat surface region through control shaft 24, and one of the boss portions 25.

The control eccentric shaft 26 supports the tubular base portion 15*a* of the rocker arm 25 rotatably, as mentioned before. The axis P1 of control eccentric shaft 26 is positioned off from the axis P of control shaft 24 with a relatively great eccentricity α.

The actuator 30 includes an electric motor 31 and a ball screw mechanism 32 serving as a speed reducer or speed reducing mechanism. Electric motor 31 is fixed to an axial end portion of a housing (not shown) fixed to a rear end portion of cylinder head 05. Ball screw mechanism 32 is enclosed in the housing, and arranged to transmit a rotational driving force of electric motor 31, to the control shaft 24.

Electric motor 31 of this example is a proportional DC motor. Motor 31 includes a motor casing 33 fixed to the housing by one or more bolts, a motor main portion formed by electric components, such as electromagnetic coil and permanent magnet enclosed in the motor casing 33, and a motor output shaft 32 rotated by the motor main portion.

Motor casing 33 includes a main portion having a cylindrical shape extending axially from a first end to a second, a fixing portion 33a and a projecting portion 33b having a cylindrical shape of a smaller diameter. The main portion, fixing portion 33a and projecting portion 33b are formed integrally as a single unit. The fixing portion 33a is a rectangular portion formed integrally at the second end of the main portion of motor casing, and fixed to one end of the above-mentioned housing by one or more bolts axially. The projecting portion 33b is formed at a central portion of a front end of the fixing portion 33a, and inserted fittingly in an open end of the housing.

Figure 1:
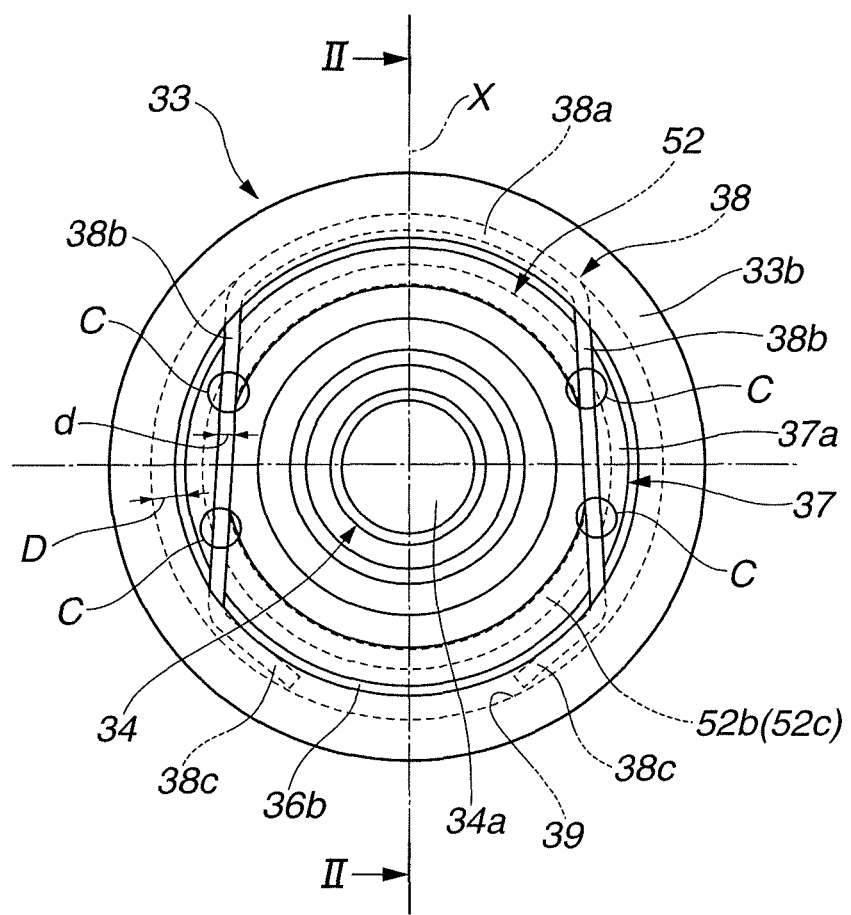
FIG. 1 is a view showing a main portion of an actuator according to a first embodiment of the present invention, as viewed from a direction shown by an arrow I in FIG. 2.
Figure 2:
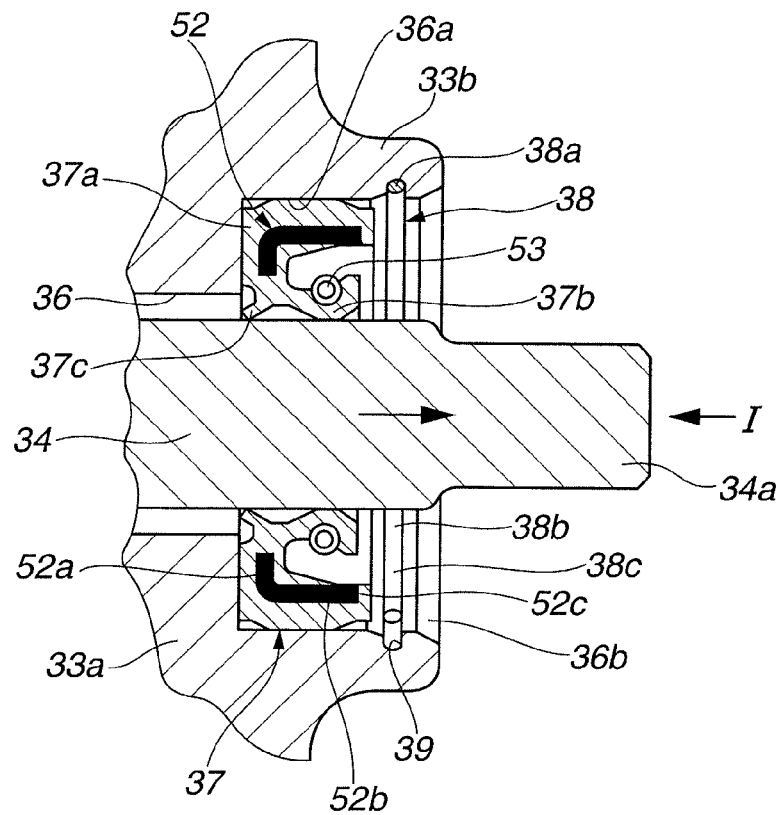
FIG. 2 is a sectional view taken across a line II-II of FIG. 1.

A stepped shaft insertion hole 36 is formed axially in the fixing portion 33a and projecting portion 33b, as shown in FIGS. 1 and 2, too. The stepped shaft insertion hole 36 extends axially through the projecting portion 33b and fixing portion 33a, to the inside of the main portion of motor casing 33. The motor output shaft 34 is inserted in the stepped axial insertion hole 36. The stepped shaft insertion hole 36 includes an enlarged portion (or larger portion or lager diameter portion) 36a at a forward end portion. A mechanical seal 37 is installed in this enlarged portion 36a. This mechanical seal 37 serves as an oil seal to seal the interspace between the motor output shaft 34 and the shaft insertion hole 36 and thereby to prevent the lubricating oil in the housing of the ball screw mechanism 32 from entering the inside of the motor casing 33.

A stopper member 38 is disposed in the enlarged portion 36a of shaft insertion hole 36, on the front side of mechanical seal 37. Stopper member 38 is held in an annular groove or annular fitting groove 39 (serving as a holding portion) formed in the inside circumferential surface of the enlarged portion 36a. Stopper member 38 functions to prevent movement of the mechanical seal 37 toward the ball screw mechanism 32, or toward the housing (in a projecting direction of the motor output shaft 34).

Motor casing 33 extends in a first axial direction (rightward direction in FIG. 6) (the projecting axial direction of motor output shaft 34), from a first end (on the left side in FIG. 6) to a second end (on the right side in FIG. 6). Motor casing 33 includes a second end surface defining the second end of motor housing 33. The shaft insertion hole 36 extends axially in motor casing 33, and terminates at an open end (36b) opening in the second end surface which is an end surface of the projecting portion 33b, in the illustrated example. Motor output shaft 34 projects (in the first axial (rightward) direction or projecting direction) from the open end of shaft insertion hole 36 opened in the second end surface of motor housing 33, toward the ball screw mechanism 32. The shaft insertion hole 36 includes the enlarged end portion or larger portion 36a extending from an annular shoulder surface surrounding the motor output shaft 34 and facing in the first axial (rightward) direction, to the open end (36b) opened in the second end surface of motor casing 33. The enlarged end portion (larger portion) 36a is defined axially by the annular shoulder surface, and radially by an inside circumferential (cylindrical) surface.

Mechanical seal 37 is fit in the enlarged end portion (larger portion) 36a of shaft insertion hole 36. Mechanical seal 37 extends, in the axial direction of motor output shaft 34, from a first (left) end to a second (right) end. The annular shoulder surface of motor casing 33 abuts on (the first (left) end of) the mechanical seal 37 and thereby limit an axial movement of mechanical seal 37 in a second axial (leftward) axial direction opposite to the first axial (rightward) direction. The fitting groove 39 is formed, in the axial direction of motor output shaft 34, between (the second (right) end of) the mechanical seal 37 and the open end (36b) of shaft insertion hole 36, and the stopper member 38 is disposed, in the axial direction of motor output shaft 34, between (the second (right) end of) the mechanical seal 37 and the open end (36b) of shaft insertion hole 36.

Electric motor 31 is connected electrically with a control unit 40 through a connector 54 fixed to an upper end portion of the fixing portion 33a, as shown in FIG. 5.

Control unit 40 senses current engine operating conditions by calculation or measurement from input information fed back as sensor signals from various sensors (not shown) such as a crank angle sensor, an air flow meter, a cooling water temperature sensor, and a potentiometer 41 for sensing the rotational position of control shaft 24, and delivers a control signal to the electromagnetic coil of electric motor 31 in accordance with the engine operating conditions.

As shown in FIGS. 5 and 6, the ball screw mechanism 32 mainly includes a ball screw shaft 42, a ball nut 43, a connection arm 44 and a link member 45. Ball screw shaft 42 and the motor output shaft 34 of motor 31 are arranged end to end and aligned with each other so that their axes form a substantially straight line or a substantially coaxial arrangement. Ball nut 43 are screwed on the ball screw shaft 42. Connection arm 44 is connected with an axial end portion of the control shaft 24, along a line extending in a diametrical direction. The link member 45 connects the connection arm 44 and the ball nut 43.

Ball screw shaft 42 is formed with an external single continuous ball circulating groove 46 extending, in the form of a helical thread of a predetermined width, over the outside surface of ball screw shaft 23 excepting both end portions. Both end portions 42a and 42b of ball screw shaft 42 are supported rotatably by first and second ball bearings 47 and 48.

Ball screw shaft 42 and the motor output shaft 34 of motor 31 are connected end to end by a tubular coupling member 49 which transmits a rotational driving force from motor 31 to ball screw shaft 42, and allows ball screw shaft 42 to move axially to a limited small extent. The tubular coupling member 49 connects a hexagonal shaft portion of the first end portion 42a of ball screw shaft 42 and a small diameter forward end portion 34a of motor output shaft 34 coaxially so as to allow slight axial movement of ball screw shaft 42.

Ball nut 43 is approximately in the form of a hollow cylinder. Ball nut 43 is formed with an internal guide groove designed to hold a plurality of balls (not shown) in cooperation with the ball circulating groove 46 of ball screw shaft 42 so that the balls can roll between the guide groove and the circulating groove. This guide groove is a single continuous helical thread formed in the inside circumferential surface of ball nut 43. Ball nut 43 is arranged to translate the rotation of ball screw shaft 42 into a linear motion of ball nut 43 and produce an axial force.

Ball nut 43 is connected rotatably with the link member 45 through a left and right pair of pivot pins 50 formed in both sides of ball nut 43 at an axial middle position and connected with the bifurcated end portion 45a of the link member 45. The second end of link member 45 is connected rotatably through a connecting pin 51 with a projecting portion 44b projecting from one end of a rhombic bracket 44a of connection arm 44. Bracket 44a of connection arm 44 includes first and second end portions, respectively, formed with bolt through holes 44c and 44d receiving bolts fastening the bracket 44a to the end of the control shaft 24.

As shown in FIG. 2, the mechanical seal 37 includes a seal base portion 37a, a seal retainer 53 and a backup spring 53. Mechanical seal 37 is an annular member mounted on motor output shaft 34. The seal base portion 37a is made of rubber material, has a C-shaped cross section, and includes an outer circumference portion including an outside circumferential surface pressed against the inside circumferential surface of the enlarged hole portion 36a and an inner circumference portion 37b surrounding and fitting over the motor output shaft 34. The seal retainer 52 is a core member (or inner ring) of metallic material, buried in the outer circumference portion of seal base portion 37a to retain the shape of the outer circumference of seal base portion 37a. The backup spring 53 is disposed around the inner circumference portion 37b of seal base portion 37a and pressing the inner circumference portion 37b against the outside circumferential surface of motor output shaft 34. The seal base portion 37a includes an inner rear end portion formed integrally with an annular seal lip 37c abutting on the outside circumferential surface of motor output shaft 34.

The seal retainer 52 is an annular member having an L-shaped cross section as shown in FIG. 2, and includes an annular portion 52a extending radially like an inward flange, and a cylindrical portion 52b extending from an outer circumference of annular portion 52a, in the axial direction of motor output shaft 34. There is formed a bend between annular portion 52a and cylindrical portion 52b. In this example, the bend is a right angle bend. The cylindrical portion 52b is buried in the outer circumference portion of seal base portion 37a. In the outer circumference portion of seal base portion 37a, the cylindrical portion 52b extends axially toward the stopper member 38, from the outer circumference of annular portion 52a, to a forward end 52c located near the stopper member 38.

Figure 3:
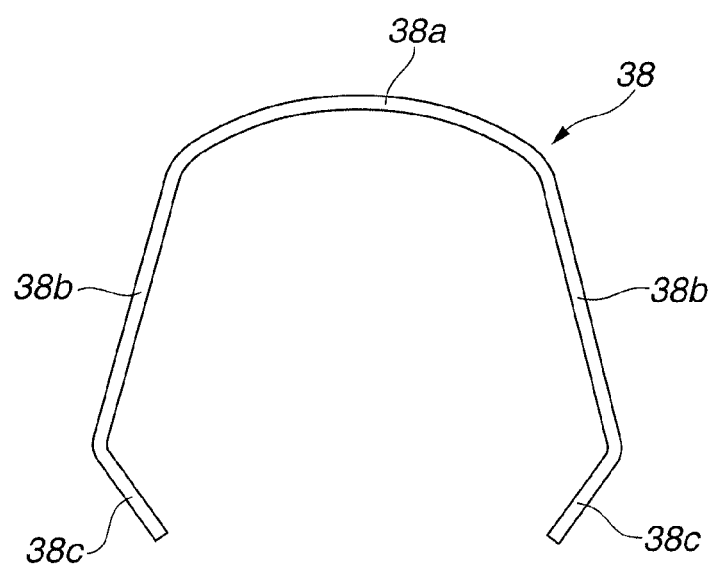
FIG. 3 is a front view of a stopper member 38 shown in FIGS. 1 and 2, in a free state.

The stopper member 38 is a wire of metallic spring material bent in the form of an inverted U, as shown in FIG. 1 and FIG. 3. In this example, stopper member 38 is a fine wire of spring steel. Stopper member 38 is so formed that stopper member 38 is capable of elastic deformation in the direction of expansion and contraction. As shown in FIG. 3, stopper member 38 is a shaped continuous wire including a base segment 38a (or middle segment or arched segment) shaped like a circular arc, a pair of beam segments 38b, 38b, and a pair of forward end segments 38c, 38c extending, respectively, from the lower ends of beam segments 38b, 38b so as to form a tapered shape becoming closer to each other gradually. The beam segments 38b, 38b are straight segments extending downwards, respectively, from both ends of base segment 38a so as to form a flared shape becoming wider apart from each other gradually in a downward direction away from the base segment 38a. The forward end segments 38c, 38c are straight segments extending, respectively, from the lower ends of beam segments 38b, 38b so as to form a tapered shape becoming closer to each other gradually in the downward direction. In this example, the beam segments 38b, 38b and forward end segments 38c, 38c are straight segments extending rectilinearly. In this example, the stopper member 38 is bilateral symmetric with respect to an imaginary median plane bisecting the base segment 38a. Beam segments 38b, 38b are located on both sides of the median plane, and inclined so that the distance from the median plane becomes gradually greater in a direction away from the base segment 38a, toward the forward end segments 38c. Forward end segments 38c, 38c are located on both sides of the median plane, and inclined so that the distance from the median plane becomes gradually smaller in the direction away from the base segment 38a. Beam segments 38b, 38b are elastically deformed in the expanding direction (to increasing the spacing between the beam segments) to form the flared shape. On each side of the median plane, the beam segment 38b and the forward end segment 38c of this example form a bend of an obtuse angle greater than 90 degrees in the free state of FIG. 3, and in the installed state shown in FIG. 1.

The fitting groove 39 is formed in the inside circumferential surface of the enlarged (large diameter) portion 36a of shaft insertion hole 36, at a shallow position near the front end of mechanical seal 37. The depth D of fitting groove 39 is slightly greater than the diameter d of the wire of stopper member 38.

The enlarged portion 36a of shaft insertion hole 36 includes a tapered surface 36b formed in the brim of the open end, for guiding the stopper member 38 in an operating of fitting the stopper member 38 in the fitting groove 39.

Therefore, in the operation of fitting stopper member 38 in fitting groove 39, first the beam segments 38b, 38b are clamped and deformed inwards to decrease the spacing between beam segments 38b, 38b from each other, then the base segment 38a is inserted into fitting groove 39 by the use of the tapered surface 36b in the state in which the beam segments 38b, 38b are held closer to each other by the clamping force, and the forward end segments 38c, 38c held closer to each other elastically by the deformation of beam segments 38b, 38b are inserted into fitting groove 38 by the use of tapered surface 36b.

After the stopper member 38 is inserted in fitting groove 39 in this way, the beam segments 38b, 38b are released from the clamping force. Accordingly, the stopper member 38 is recovered toward the original wide shape by its own elasticity. Therefore, the forward end portions 38c and 38c are fit elastically in fitting groove 39 and the base segment 38a is also fit elastically in fitting groove 39, as shown in FIG. 1.

In this installed state, the base segment 38a is concealed or hidden in fitting groove 39 and the forward (or lower) end segments 38c, 38c are also concealed or hidden in fitting groove 39. On the other hand, the beam segments 38b, 38b are exposed, without being fit and concealed in fitting groove 39, in the state in which the two beam segments 38b, 38b extend approximately in parallel to a diametrical line X (representing the median plane) in the inner region within the outside circumference of mechanical seal 37. In this example, the beam segments 38b, 38b are not completely parallel, but the beam segments 38b, 38b are arranged so that the spacing therebetween becomes slightly greater in the direction from the base portion 38a toward the lower end portions 38c, 38c. In this installed state, beam segments 38b, 38b are arranged symmetrically in the manner of bilateral symmetry with respect to the diametrical line X of mechanical seal 37 (representing the median plane).

Therefore, the left and right beam segments 38b, 38b are positioned so as to confront the forward end 52c of cylindrical portion 52b of the seal retainer 52 of mechanical seal 37 at upper two positions and lower two positions (indicated in FIG. 1, by four small circles C) in the axial direction of motor output shaft 24.

[Operations of Variable Valve Operating Apparatus]

The variable valve operating apparatus is operated as follows: In a low speed operation region including an idling operation of the engine, in response to a control signal delivered from control unit 40, a rotational torque is transmitted from electric motor 31 to ball screw shaft 42. With rotation of ball screw shaft 42, each of the balls rolls between the ball circulating groove 46 and the guide groove, and thereby causes the ball nut 43 to move linearly in a leftward direction in FIG. 5. With this movement, the control shaft 24 is rotated in one direction by the link member 45 and connection arm 44. Therefore, the control eccentric shaft 26 is rotated to the same position and the control eccentric shaft 26 moves slightly downward from the drive shaft 4. Therefore, the motion transmitting mechanism 8 is inclined in the clockwise direction about the drive shaft 4. With this inclination, each of the swing cams 7 is rotated in the clockwise direction and the contract point of the roller 14 is shifted toward the base circle.

With the rotation of drive cam, the link arm 16 pushes up the rocker arm 15, the link rod 17 rotates the swing cam 7 in the clockwise direction by raising the connecting portion 7b of swing cam 7, the lift is transmitted to the roller 14 of swing arm 6 and the valve is lifted. In this case, the lift (quantity) and operation angle are made small enough, so that the valve is operated with very small lift and operation angle.

Consequently, in the low speed, light load engine operating region, the variable valve operating system decreases the valve lift of each intake valve 3 sufficiently, thereby retards the valve opening timing of each intake valve 3, and eliminates the valve overlap with the exhaust valve. Thus, the variable valve operating system can improve the combustion, improve the fuel economy and stabilize the rotation of the engine.

When the engine operating point is shifted into a low and medium speed, medium load region, the control shaft 24 is rotated through electric motor 31 in response to the control signal from control unit 40, further in the clockwise direction as shown in FIG. 4, and the control eccentric shaft 26 is rotated to the same position. Therefore, the motion transmitting mechanism 8 is rotated in the clockwise direction about drive shaft 4, and hence each swing cam 7 is rotated relatively in the lift direction.

Consequently, at a peak lift at the time of valve opening, the lift of swing cam 7 is transmitted to a the roller 14, such as needle roller, of swing arm 6, and the intake valve is operated with a medium lift and a medium operation angle.

When the engine operating point is shifted to a high speed, high load engine operating region, the electric motor 31 rotates the control shaft 24 further in the clockwise direction in FIG. 4 through ball screw mechanism 32. Accordingly, the control eccentric shaft 26 is rotated in the same direction to the position closest to the drive shaft 4. Therefore, the motion transmitting mechanism 8 is rotated further in the clockwise direction, and each swing cam 7 is rotated further in the lift direction. Consequently, at the peak lift at the time of valve opening, each swing cam 7 further increases the valve lift and the valve operation angle to the maximum lift and the maximum operation angle.

Therefore, in this engine operating region, the variable valve operating system increases the valve lift and the valve operation angle to the respective maximum values, increases the valve overlap with the exhaust valve, and retards the valve closing timing sufficiently. Therefore, the variable valve operating mechanism can ensure the engine output satisfactorily by improving the intake charging efficiency.

[Operations and Effects of the Stopper Member]

In the installed state, as mentioned before, the base segment 38a is fit and held in the fitting groove 39 on the upper side of the beam segments 38b, 38b, and the forward end segments 38c, 38c are fit and held in the fitting groove 39 on the lower side of beam segments 38b, 38b. In this state, the beam segments 38b, 38b axially confront the forward end 52c of cylindrical portion 52b of seal retainer 52 at four positions (indicated by the small circles C) in the axial direction of motor output shaft 24.

Therefore, if, because of a change in the internal pressure in the motor casing 33 due to an ambient temperature change of actuator 30, the mechanical seal 37 is pushed in the direction (shown by an arrow in FIG. 2) (projecting direction) toward ball screw mechanism 32, the stopper member 38 can prevent movement of mechanical seal 37 toward the bass screw mechanism 32 (in the projecting direction) reliably with the pair of beam segments 38b, 38b abutting against the mechanical seal 37 at the four positions confronting the seal retainer 52.

Thus, the stopper member 38 can secure the mechanical seal 37 stably in the installed state irrespective of change in the internal pressure in motor casing 33, and thereby provide satisfactory sealing performance by preventing deterioration of the sealing function. As a result, this structure including stopper member 38 can prevent ingress of the lubricating oil supplied into the housing of ball screw mechanism 32, into the motor casing 33 reliably.

The base segment 38a and forward end segments 38c, 38c of stopper member 38 are fit and concealed securely in fitting groove 39 on the upper side and the lower side of beam segments 38b, 38b. Therefore, even if mechanical seal 37 is moved in the axial direction shown by the arrow shown in FIG. 2, the forward end segments 38c, 38c are not forced out of the fitting groove 39. In a comparable arrangement in which the forward end segments 38c, 38c are bend inward with a greater bend angle, and the forward ends project inward (in an exposed state), the forward ends of forward end portions 38c, 38c may be pushed in the moving direction by the mechanical seal 37 and extracted from the fitting groove 39, and the stopper member 38 may be extracted as a whole from fitting groove 39.

By contrast to the comparative arrangement, the entireties of forward end segments 38c, 38c are fit and concealed in fitting groove 39. Therefore, the forward end segments 38c, 38c are held securely in fitting groove 39 without being forced out of fitting groove 39 by a pushing force due to the movement of mechanical seal 37.

In this embodiment, the limitation of movement of mechanical seal 37 is performed merely by the stopper member 38 formed by bending spring steel wire into the specific form without requiring a complicated mechanism. Therefore, the actuator of this embodiment can achieve a high sealing performance without increasing the manufacturing cost. Moreover, the objective is achieved without increasing the number of component parts and the number of assembly operations. Therefore, the embodiment can retrain an increase of the manufacturing cost.

Furthermore, stopper member 38 is held and supported firmly in fitting groove 39, at one upper point with the base segment 38a fit in the fitting groove 39, and at two lower points with the forward end segments 38c, 38c fit and concealed in fitting groove 39. Therefore, stopper member 38 can support mechanical seal 37 reliably.

Second Embodiment

Figure 7:
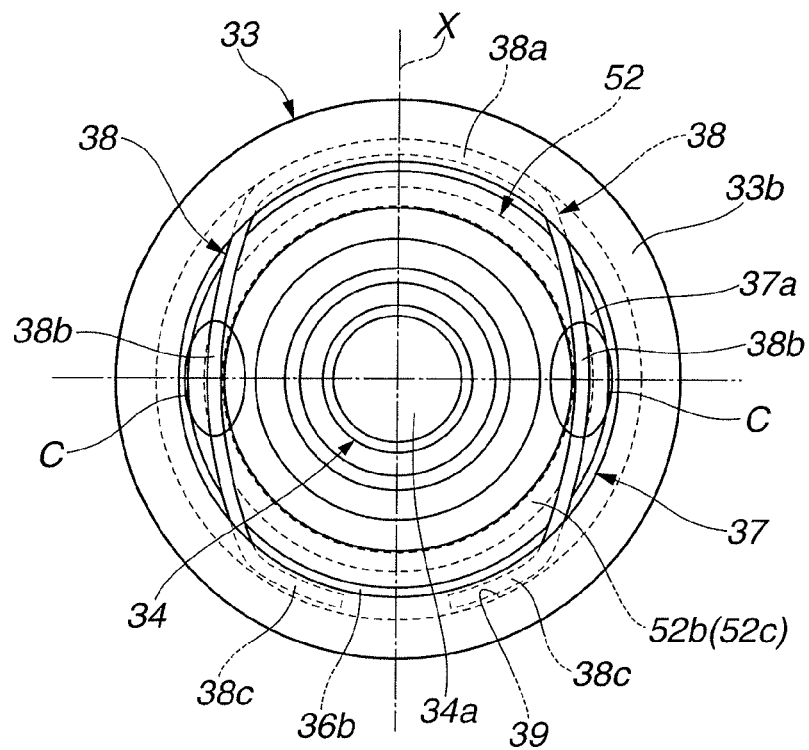
FIG. 7 is a view showing a main portion of an actuator according to a second embodiment of the present invention, as viewed from the direction shown by the arrow I in FIG. 2.
Figure 8:
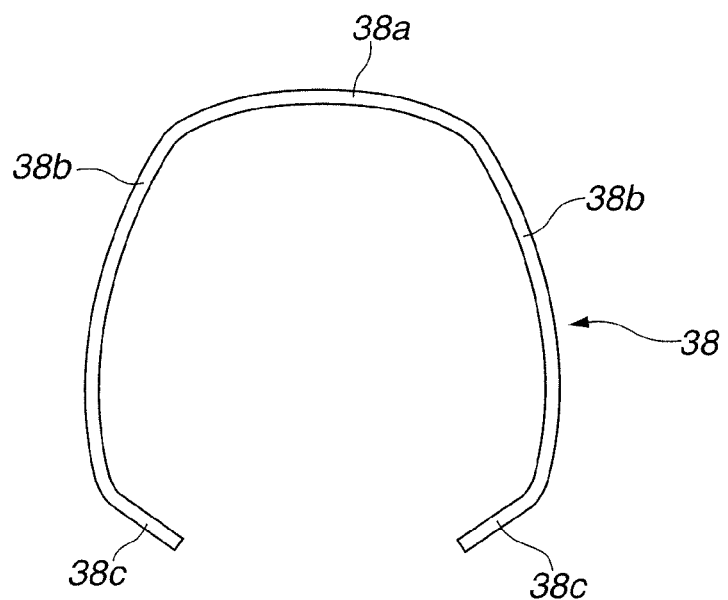
FIG. 8 is a front view of a stopper member 38 shown in FIG. 7, in a free state.

FIGS. 7 and 8 are views for showing a second embodiment in which the shape of the stopper member 38 is changed. In the stopper member 38 shown in FIG. 8 in the free state, the beam segments 38b are curved so as to bulge outwards to form a barrel-like shape, and the forward end segments 38c are expanded wider apart from each other. When the base segment 38a and the forward end segments 38c are fit fixedly in fitting groove 39 by the use of the elastic force, the beam segments 38b, 38b are bulged outwards into a barrel shape as shown in FIG. 7.

In the installed state shown in FIG. 7, the beam segments 38b, 38b confront the seal retainer 52 of mechanical seal 37 at two central positions (indicated by elongated circles C). Therefore, the second embodiment can provide the same effect as the first embodiment.

In the installed state of FIG. 7, the seam segments 38b, 38b are curved so as to form a barrel shape. Therefore, each of beam segments 38b confronts the seal retainer 53 over a wider surface region spreading along the circular arc of seal retainer 52. Therefore, the stopper member 38 can support the seal retainer 52 effectively with only two confronting portions (indicated by C).

Third Embodiment

Figure 9:
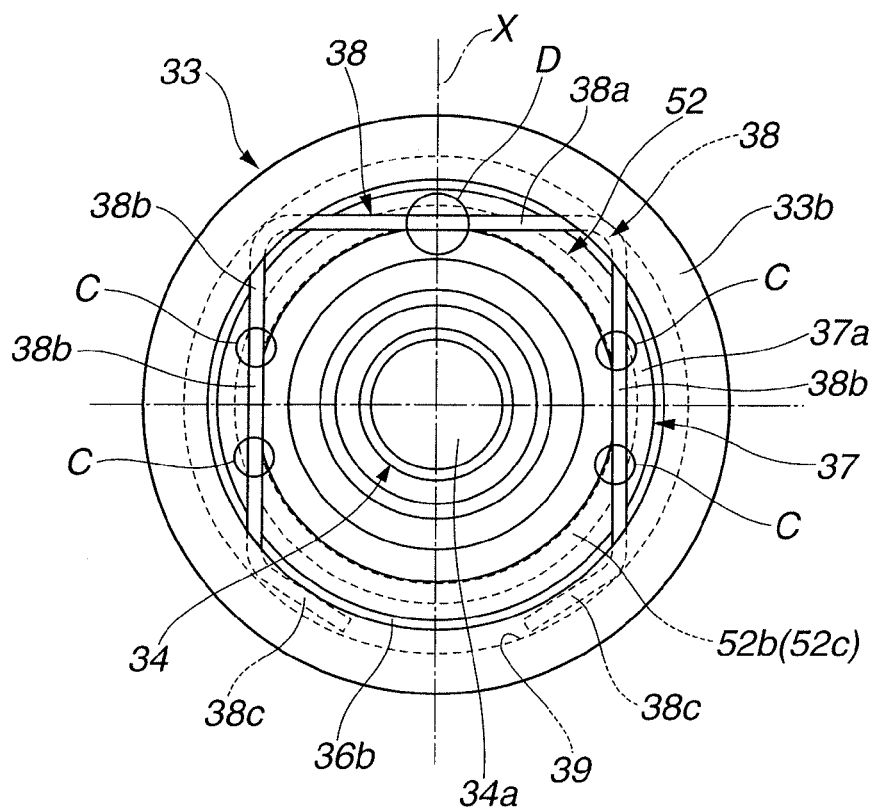
FIG. 9 is a view showing a main portion of an actuator according to a third embodiment of the present invention, as viewed from the direction shown by the arrow I in FIG. 2.
Figure 10:
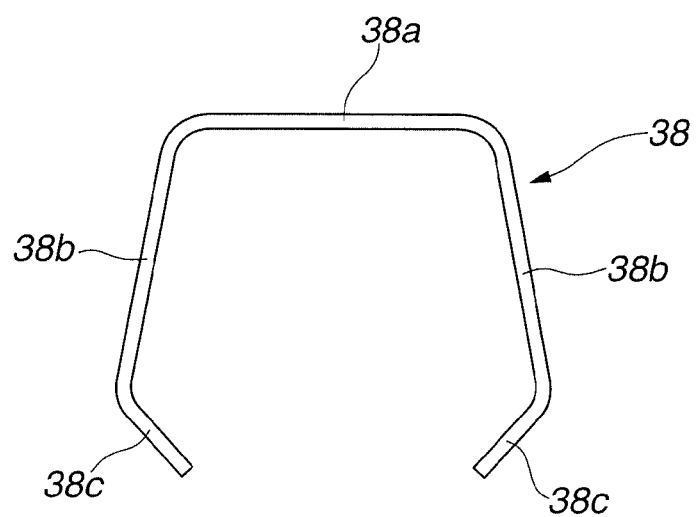
FIG. 10 is a front view of a stopper member 38 shown in FIG. 9, in a free state.

FIGS. 9 and 10 are views for showing a third embodiment in which the shape of the stopper member 38 is further changed. In the stopper member 38 according to the third embodiment, the base segment 38a is straight. In the free state shown in FIG. 10, the beam segments 38b, 38b are expanded in a flared shape so that the spacing between beam segments 38b, 38b becomes greater in the direction from the middle of the base segment 38a toward the middle of the gap between the forward end segments 38c, 38c. Accordingly, the forward end segments 38c, 38c are spaced wider apart. When the base segment 38a and the forward end segments 38c are fit fixedly by the use of the elastic force, the stopper member 38 is shaped like a square or a rectangle as shown in FIG. 9. The forward end segments 38c, 38c are curved along the annular fitting groove 39 and fit in the concealed state in annular fitting groove 39, as in the first and second embodiments.

In the installed state of FIG. 4, the stopper member 38 confronts the seal retainer 52 of mechanical seal 37 at a middle of base segment 38a (indicated by a circle D), and at four points (indicated by circles C) on the upper side and lower side of the center axis. Therefore, the third embodiment can provide the same effects as in the first embodiment.

The invention is not limited to the illustrated embodiments described above. For example, the stopper member (38) including the beam segments confronting the oil seal (37) of the seal retainer (52) of the oil seal may be formed in various shapes. The speed reducing mechanism may be a mechanism other than the ball screw mechanism (32). The cross sectional shape of the stopper member (38) may be circular, triangular, square or rectangular. The present invention is applicable to various variable valve operating systems using an electric motor.

According to one of possible interpretations of the illustrated embodiment, a variable valve operating apparatus or system comprises a valve operating mechanism to vary a valve operating characteristic, such as a valve lift and/or a valve operation angle, of an internal combustion engine in accordance with a position of a control element (24); and an electric motor (31) to move the control element (24). The electric motor includes a motor casing (33) formed with a shaft insertion hole (36) including an end portion (36a) terminating at an open end (36b) and a motor output shaft (34) extending in the shaft insertion hole and projecting from the open end in a projecting (axial) direction (rightward direction in FIG. 2). There is further provided an oil sealing structure including an annular oil seal (37) disposed in the end portion of the shaft insertion hole, around the motor output shaft and a stopper member (such as a ring-shaped stopper wire) (38) which extends circumferentially, around the motor output shaft, from a first end to a second end spaced from the first end, and arranged to limit movement of the oil seal (37) in the projecting direction. In addition to these basic features, the oil sealing structure further includes any one or more of following features (f1) . . . .

(f1) The stopper member is a ring-shaped spring wire (38) which includes a middle base segment (38a), first and second forward end segments (38c) which terminate, respectively, at the first and second ends of the stopper member and confront each other across a gap, a first beam segment (38b) extending from (a first end of) the middle base segment to the first forward end segment and a second beam segment extending from (a second end of) the middle base segment to the second forward end segment. (f2) The stopper member (38) is held in an annular fitting groove (39) formed, around the motor output shaft, in an inside circumferential surface defining the end portion (36a) of the shaft insertion hole (36), at an axial position between the annular oil seal (37) and the open end (36b) of the shaft insertion hole (36). (f3) The middle base segment (38a) and the first and second forward end segments (38c) are held in the annular fitting groove, whereas the first and second beam segments are exposed to prevent movement of the oil seal in the projecting direction.

(f4) The stopper member is a ring-shaped wire extending circumferentially from the first end to the second end spaced from the first end, and including a base segment (38a) which is held in the fitting groove, and which extends circumferentially from a first end point to a second end point, a first forward end segment (38c) which extends from a first intermediate point to the first end of the stopper member and which is held in the fitting groove, a second forward end segment which extends from a second intermediate point to the second end of the stopper member and which is held in the fitting groove, and the beam segments including first and second beam segments (38b,38b), the first beam segment extending from the first end point of the base segment, to the first intermediate point, the second beam segment extending from the second end point of the base segment, to the second intermediate point.

This application is based on a prior Japanese Patent Application No. 2010-248231 filed on Nov. 5, 2010. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An actuator for a variable valve operating apparatus to vary a valve operating characteristic of an internal combustion engine by controlling a control shaft in the variable valve operating apparatus, the actuator comprising:

an electric motor including a motor casing formed with a shaft insertion hole and a motor output shaft extending in the shaft insertion hole;

a speed reducing mechanism to transmit a rotational driving force of the motor output shaft to the control shaft with speed reduction;

an annular oil seal which is disposed between the shaft insertion hole and the motor output shaft and which includes an annular seal retainer buried in the annular oil seal for reinforcement; and a ring-shaped stopper member which extends circumferentially from a first end to a second end spaced from the first end, which is held in a holding portion of the shaft insertion hole and which is arranged to prevent movement of the oil seal toward the speed reducing mechanism, the stopper member including a plurality of beam segments confronting the seal retainer from an axial direction of the motor output shaft, wherein the motor casing includes the shaft insertion hole and the holding portion including a fitting groove formed in an inside circumferential surface defining the shaft insertion hole; and wherein the stopper member is a ring-shaped wire extending circumferentially from the first end to the second end spaced from the first end, and including a base segment which is held in the fitting groove, and which extends circumferentially from a first end point to a second end point, a first forward end segment which extends from a first intermediate point to the first end of the stopper member and which is held in the fitting groove, a second forward end segment which extends from a second intermediate point to the second end of the stopper member and which is held in the fitting groove, and the beam segments including first and second beam segments, the first beam segment extending from the first end point of the base segment, to the first intermediate point, the second beam segment extending from the second end point of the base segment, to the second intermediate point.

2. The actuator as claimed in claim 1, wherein each of the beam segments is a straight segment extending substantially straight.

3. The actuator as claimed in claim 1, wherein the stopper member is a shaped wire of spring steel.

4. The actuator as claimed in claim 1, wherein the holding portion is an annular fitting groove formed in an inside circumferential surface of an open end portion of the motor casing.

5. The actuator as claimed in claim 1, wherein the speed reducing mechanism includes a ball screw mechanism which includes a ball nut arranged to move linearly by receiving a rotational driving force from the motor output shaft, and thereby to control the control shaft.

6. The actuator as claimed in claim 5, wherein the actuator further comprises a link member connected between the ball nut and a connection arm connected with the control shaft, and arranged to convert a linear movement of the ball nut into a rotational movement of the control shaft.

7. An actuator for a variable valve operating apparatus to vary a valve operating characteristic of an internal combustion engine by controlling a control shaft in the variable valve operating apparatus, the actuator comprising:

an electric motor including a motor casing formed with a shaft insertion hole and a motor output shaft extending in the shaft insertion hole;

a speed reducing mechanism to transmit a rotational driving force of the motor output shaft to the control shaft with speed reduction;

an annular oil seal which is disposed between the shaft insertion hole and the motor output shaft and which includes an annular seal retainer buried in the annular oil seal for reinforcement; and a ring-shaped stopper member which extends circumferentially from a first end to a second end spaced from the first end, which is held in a holding portion of the shaft insertion hole and which is arranged to prevent movement of the oil seal toward the speed reducing mechanism, the stopper member including a plurality of beam segments confronting the seal retainer from an axial direction of the motor output shaft, wherein the stopper member is a ring-shaped wire extending circumferentially from a first forward end segment terminating at the first end of the stopper member, to a second forward end segment which terminates at the second end of the stopper member and which confronts the first forward end portion across a gap between the first and second ends of the stopper member, the stopper member being an elastic member capable of deforming in an expanding direction;

wherein the beam segments include first and second beam segments, the first beam segment extends continuously from the first forward end segment, and the second beam segment extends continuously from the second forward end segment, and the first and second beam segments are arranged to flare so that a distance between the first and second beam segments becomes gradually greater toward the first and second ends of the stopper member.

8. An actuator for a variable valve operating apparatus including a variable mechanism to vary a valve operating characteristic of an internal combustion engine by rotating a control shaft in the variable valve operating apparatus, the actuator comprising:

an electric motor including a motor casing formed with a shaft insertion hole including an end portion terminating at an open end and a motor output shaft extending in the shaft insertion hole and projecting from the open end in a projecting direction;

a transmitting mechanism connected with the motor output shaft projecting from the open end of the shaft insertion hole, and arranged to transmit a rotational driving force of the motor output shaft to the control shaft;

an annular oil seal disposed in the end portion of the shaft insertion hole, around the motor output shaft and a ring-shaped stopper wire which extends circumferentially, around the motor output shaft, from a first wire end to a second wire end spaced from the first end, and which includes a middle base segment, first and second forward end segments which terminate, respectively, at the first and second wire ends and confront each other across a gap, a first beam segment extending from the middle base segment to the first forward end segment and a second beam segment extending from the middle base segment to the second forward end segment;

the stopper wire being held in an annular fitting groove formed, around the motor output shaft, in an inside circumferential surface defining the end portion of the shaft insertion hole, at an axial position between the annular oil seal and the open end of the shaft insertion hole, and arranged to prevent movement of the oil seal in the projecting direction;

the middle base segment and the first and second forward end segments being held in the annular fitting groove, whereas the first and second beam segments are exposed to prevent movement of the oil seal in the projecting direction.

9. The actuator as claimed in claim 8, wherein the stopper wire is made of metallic spring material, and the first and second forward end segments of the stopper wire are elastically held in the fitting groove by elasticity of the stopper wire expanding the first and second forward end segments wider apart from each other in the annular fitting groove.

10. The actuator as claimed in claim 8, wherein the stopper wire includes a first half including the first beam segment and the first forward end segment and a second half including the first beam segment and the first forward end segment, the first and second halves being substantially symmetrical with respect to an imaginary median plane bisecting the middle base segment and the gap between the first and second wire ends, the first and second beam segments are arranged in a flared form in which a spacing between the first and second beam segments is increased gradually in a direction from the middle base segment to the gap at least in a free state of the stopper wire not confined in the fitting groove, and the first and second forward end segments are arranged in a tapered form in which a spacing between the first and second forward end segments is decreased gradually in the direction from the middle base segment to the gap at least in the free state of the stopper wire not confined in the fitting groove.

11. The actuator as claimed in claim 8, wherein the end portion of the shaft insertion hole is an enlarged portion defined by an annular shoulder surface facing in the projecting direction and the inside circumferential surface, and extending axially to the open end of the shaft insertion hole, the annular seal is disposed axially between the annular shoulder surface and the annular fitting groove, and the stopper wire is disposed axially between the annular seal and the open end of the shaft insertion hole.

12. The actuator as claimed in claim 8, wherein the middle base segment is a curved segment curved in a form of a circular arc.

13. The actuator as claimed in claim 8, wherein the middle base segment is a straight segment extending substantially straight.

14. The actuator as claimed in claim 8 wherein the annular fitting groove is recessed radially outwards in the inside circumferential surface defining the end portion of the shaft insertion hole, and the annular fitting groove has a depth, as measured radially outwards from the inside circumferential surface, to conceal the middle base segment and the first and second forward end segments of the stopper wire so that the middle base segment and the first and second forward end segments of the stopper wire do not project radially inwards from the annular fitting groove.

* * * * *